United States Patent [19]
McInnes

[11] Patent Number: 5,598,809
[45] Date of Patent: Feb. 4, 1997

[54] TEAT

[76] Inventor: Ross G. McInnes, Waipu, New Zealand

[21] Appl. No.: 381,950

[22] PCT Filed: Aug. 11, 1993

[86] PCT No.: PCT/NZ93/00065

§ 371 Date: Feb. 13, 1995

§ 102(e) Date: Feb. 13, 1995

[87] PCT Pub. No.: WO94/04023

PCT Pub. Date: Mar. 3, 1994

[30] Foreign Application Priority Data

Aug. 12, 1992 [NZ] New Zealand .............................. 244008
Mar. 24, 1993 [NZ] New Zealand .............................. 247242

[51] Int. Cl.$^6$ .............................. A01K 9/00; A61J 11/00
[52] U.S. Cl. .............................................. 119/71; 215/11.1
[58] Field of Search .................................. 215/11.1, 11.4; 119/71

[56] References Cited

U.S. PATENT DOCUMENTS

| | | |
|---|---|---|
| 605,161 | 6/1898 | Clement et al. .................. 215/11.1 |
| 1,605,427 | 11/1926 | Delmas . |
| 2,223,179 | 11/1940 | Lougheed . |
| 2,533,643 | 12/1950 | Verner . |
| 3,042,002 | 7/1962 | Liell . |
| 3,995,596 | 12/1976 | Andersson .................... 119/71 |
| 4,623,069 | 11/1986 | White . |

FOREIGN PATENT DOCUMENTS

| | | |
|---|---|---|
| 457697 | 11/1991 | European Pat. Off. . |
| 2190360 | 6/1972 | France . |
| 2658074 | 8/1991 | France . |
| 1325502 | 3/1971 | United Kingdom . |
| 1481560 | 12/1974 | United Kingdom . |
| 2066795 | 7/1981 | United Kingdom . |
| 2215318 | 9/1989 | United Kingdom . |
| 2226014 | 6/1990 | United Kingdom . |

Primary Examiner—Robert P. Swiatek
Attorney, Agent, or Firm—Evenson, McKeown, Edwards & Lenahan

[57] ABSTRACT

A teat for feeding liquids to animals adapted to be fastened to a source of liquid such as a pipe or drum in use to project outwardly from the source. The teat has a resilient outer end which is closed apart from a slit in it which slit is itself normally adapted to be closed by the resilience to provide a sufficient liquid seal. The closed outer end is preferably concave, coned, cusped or otherwise re-entrant. A reinforcing member such as webs are located, preferably internally on either side of the slit so that if the end of the teat is squashed or compressed by sucking forces exerted by the animal, with components along the direction of slit, the reinforcing member causes the slit to be pulled open, thereby allowing liquid to flow out of it in use. The pulling action allows an acceptable flow rate from a comparatively small slit which is less prone to leak than a large slit.

20 Claims, 4 Drawing Sheets

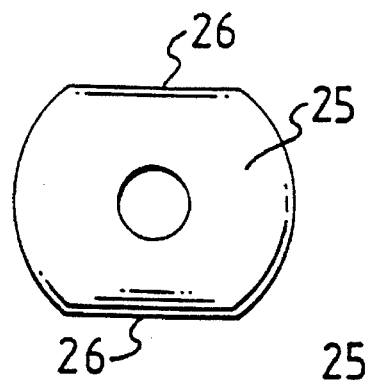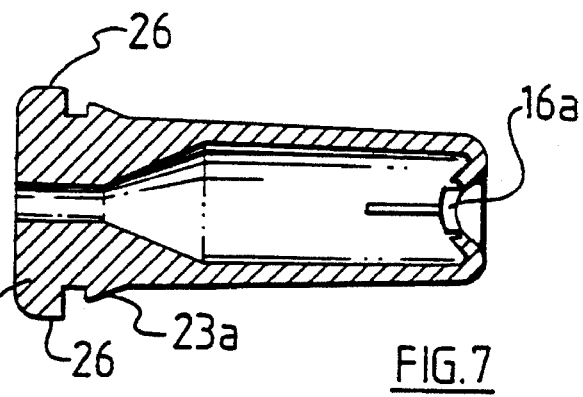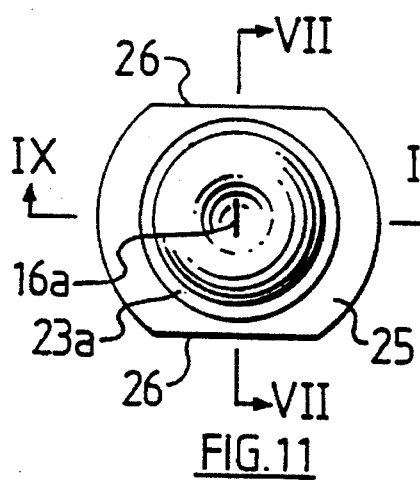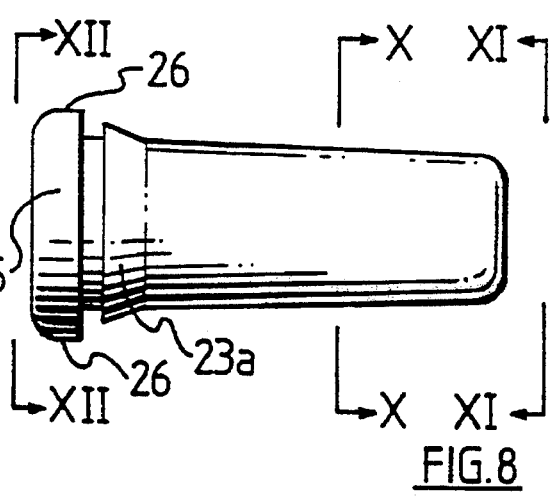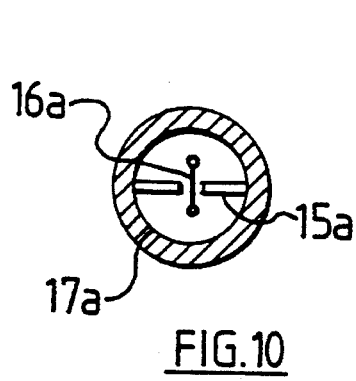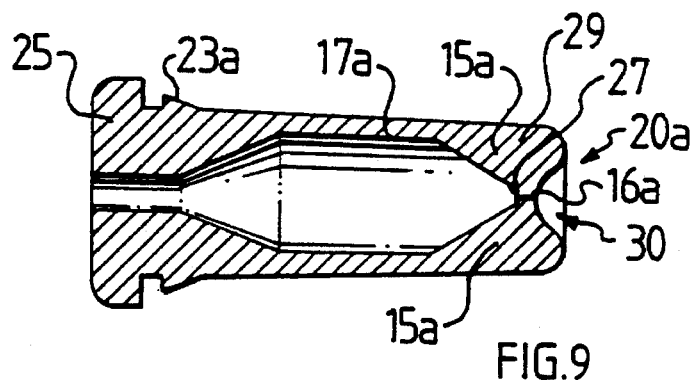

TEAT

TECHNICAL FIELD

This invention relates to an improved teat. Where animals are to be artificially reared on milk or other liquids, teats are usually the preferred means of facilitating a young animal to self-feed.

BACKGROUND ART

For example, in order to feed numerous calves at one time, there may be a row of teats projecting horizontally around the top perimeter of a container and those teats would normally be connected to tubes equipped with one-way valves to enable liquid to be drawn up from the bottom of the container when the teat is sucked. Obviously in such a construction, as long as the teat level is above the liquid level, there is no danger of appreciable quantities of the liquid leaking out of the teat under gravitational pressure.

However, where the teats are to be gravity fed they may be situated, for example, at the base of a container so that there is a head of liquid above the teats of perhaps up to 2 metres, and it then becomes imperative that the teats be self-sealing and able to resist that amount of pressure.

DISCLOSURE OF INVENTION

The present invention consists in a teat having fastening means enabling the teat to be fastened to a source of liquid in use to project outwardly from the source, the teat having an outer end which is closed apart from a slit in it which slit is itself normally adapted to be closed to provide a sufficient liquid seal, the outer end of the teat being made of a resilient material with reinforcing means on either side of the slit so that if the end of the teat is squashed or compressed by forces with components along the direction of slit, the reinforcing means causes the slit to be opened, thereby allowing liquid to flow out of it in use.

The advantage of the present invention is that a small slit can be used with better sealing characteristics while ensuring a high volume of liquid is released through the slit by stretching it open when sucking occurs.

BRIEF DESCRIPTION OF DRAWINGS

The preferred forms of the present invention will now be described with reference to the accompanying drawings in which:

FIG. 7 shows a central longitudinal cross-section of a further preferred form of teat, the section being aligned with the slit, FIG. 8 shows a side elevation of the teat of FIG. 7, FIG. 9 shows a longitudinal cross-section of the teat of FIG. 7 at right angles to the cross-section of FIG. 7, FIG. 10 shows a cross-sectional view on the plane X—X of FIG. 8, FIG. 11 shows an end view in the direction XI—XI of FIG. 8, and FIG. 12 shows an end view in the direction XII—XII of FIG. 8.

MODES FOR CARRYING OUT THE INVENTION

Figure 1:
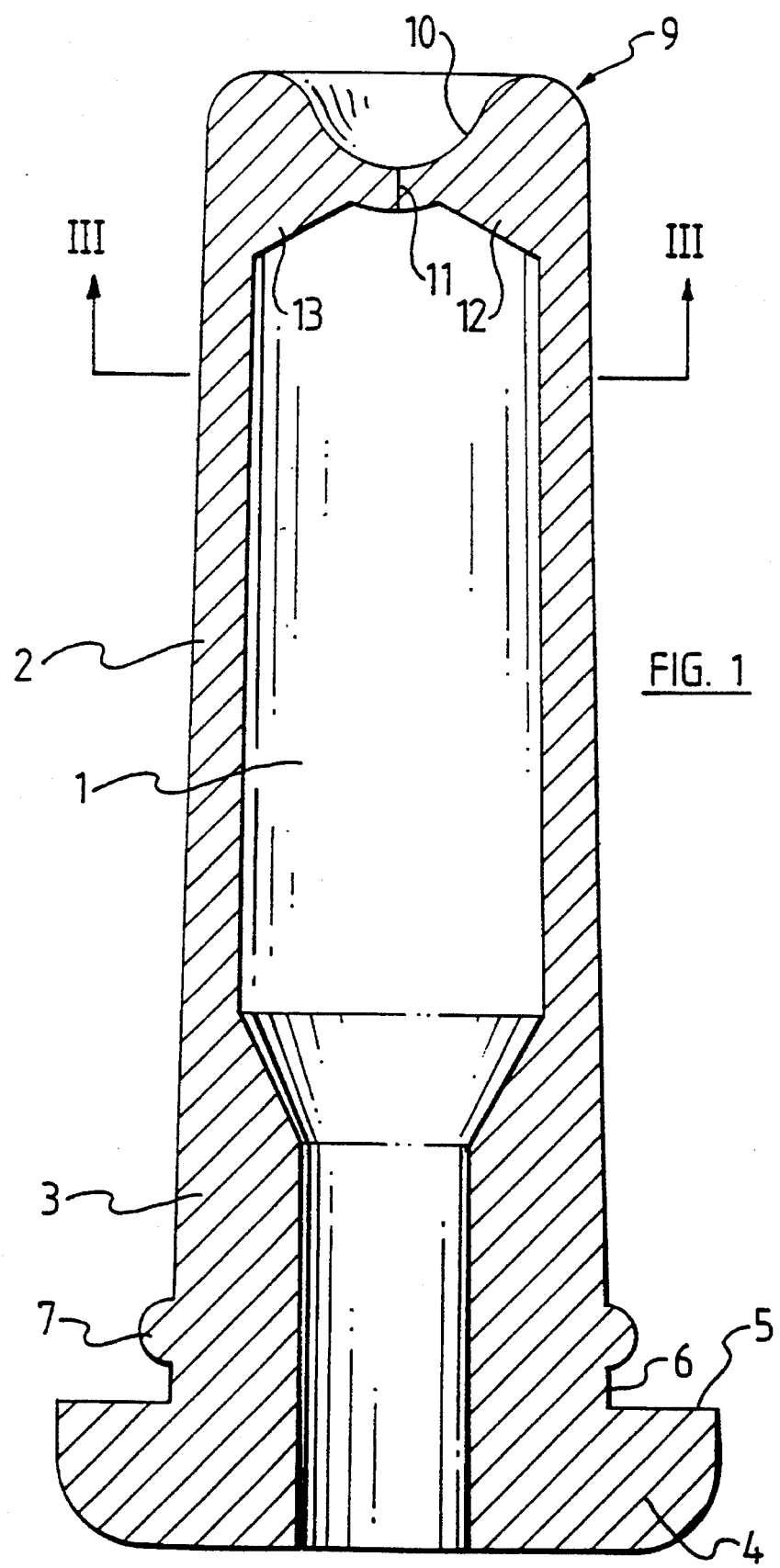
FIG. 1 shows a central longitudinal cross-section of one form of teat, the section being at right angles to the slit.
Figure 2:
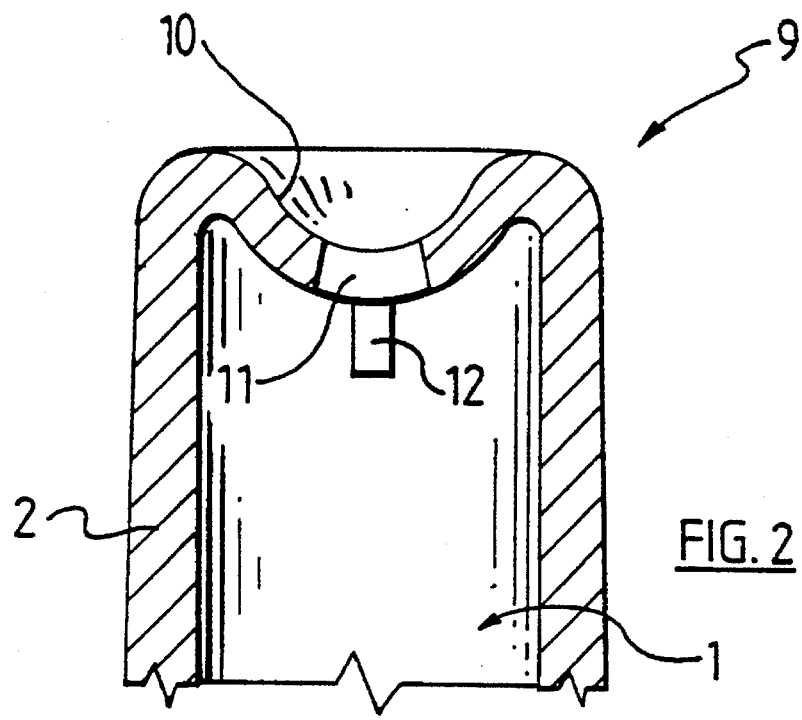
FIG. 2 shows a central longitudinal cross-section through the end of the teat, at right angles to that shown in FIG. 1.

As shown in FIG. 1, the teat is preferably substantially cylindrical, having a hollow center 1 and the thickness of the wall 2 is thinner at what will be the outer end of the teat in use, compared to the thickness of the inner portion 3 which will abut the liquid source—usually a container. A flange 4 is adapted to lie against the inner surface of the liquid container so that surface 5 will abut the inside wall of the container. The cylindrical surface 6 will pass through a hole in the wall of the container, there being a tight fit at this point, and a locking means, which may be in the form of a circumferential rib 7 of semi-circular cross-section, is adapted to abut against the outer wall of the container to lock the teat in place. The teat will normally project horizontally, but in some instances the teat may be installed with an upward or downward inclination. Typically the length of the teat would be about 80 mm and the wall thickness near its outer end 9 would be about 2.5 mm.

Figure 3:
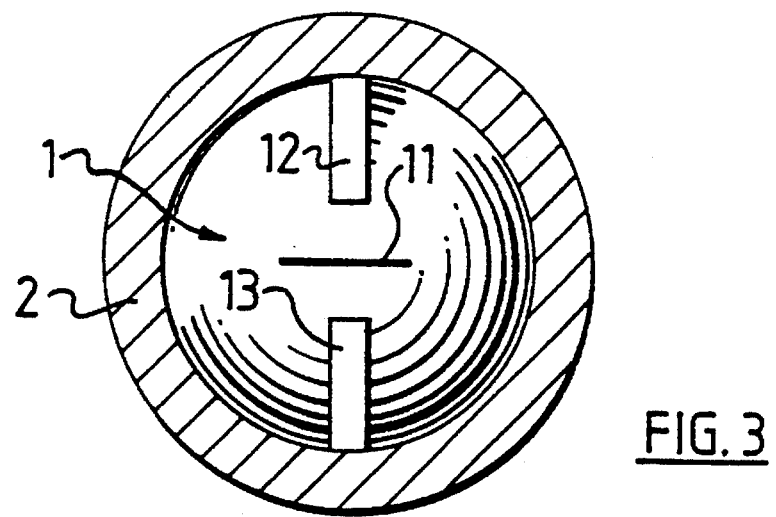
FIG. 3 shows a cross-sectional view on the plane III—III of FIG. 1.

The teat is made of resilient rubber or other suitable material and the outer end 9 is closed by means of a preferably concave portion 10 which has a slit 11 provided at its center. The slit would be about 5 to 10 mm long and is not moulded into the teat but is pierced into the teat after moulding. Reinforcing means are preferably provided by means of two integrally moulded webs 12 and 13 and these are preferably co-planar, at right angles to the slit 11, and lie on the same diameter as can be seen from FIG. 3. They would have a thickness of approximately 2 mm.

In operation when there is a squeezing action exerted on the side walls at the outer end 9 and there are force components aligned with the direction of the slit 11, so that the outer walls are tending to be squashed towards the webs 12 and 13, then the stiffness imparted by the webs, which will then be under tension, will, on such deformation of the end of the teat, cause the slit to open, thus allowing liquid to flow through it. Thus with the typical sucking action of an animal which consists in the animal effectively biting and then releasing the bite on the teat in a rapid series of repetitive movements, the feeding liquid can flow out of the slit whenever the teat is bitten or squeezed, provided that there is a force component along the length of the slit. If, however, the force components are all at right angles to the length of the slit, then there will be no tendency for the slit to open. Usually, since the teats will be installed to project horizontally, or at least at an angle with some horizontal component, the slits will be arranged, as the teats are being inserted into the liquid container, so that each slit is in a vertical or substantially vertical plane. Thus, there is a reasonable likelihood that the sucking action will be in the right direction to cause opening of the slit.

Figure 4:
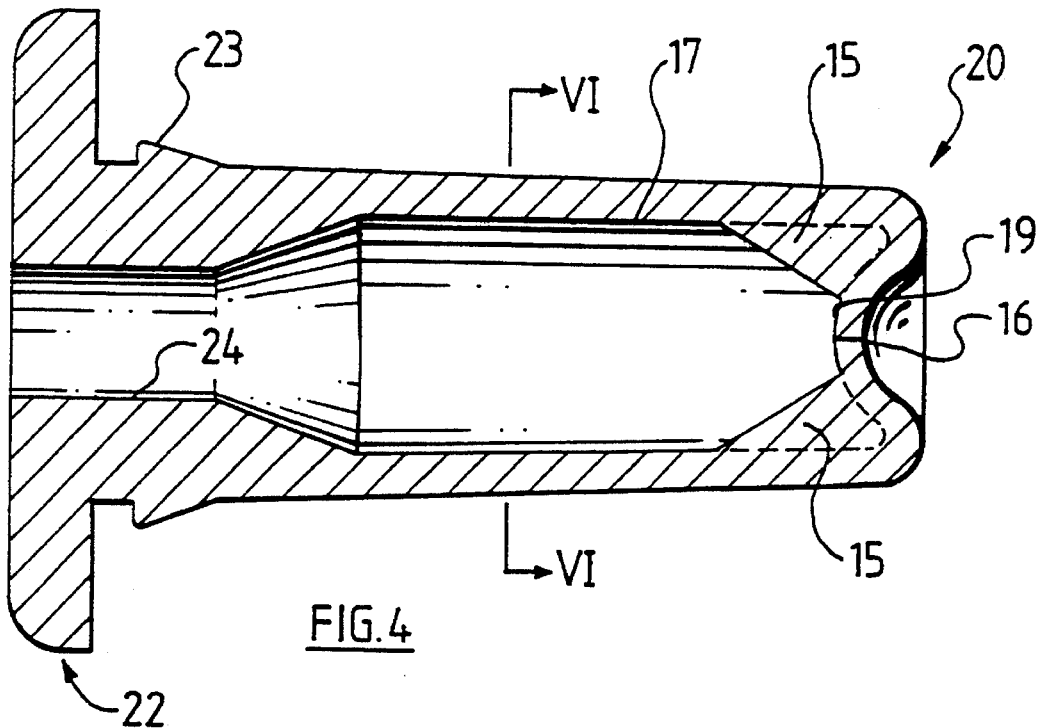
FIG. 4 shows a central longitudinal cross-section of a second form of teat, the section being at right angles to the slit.
Figure 6:
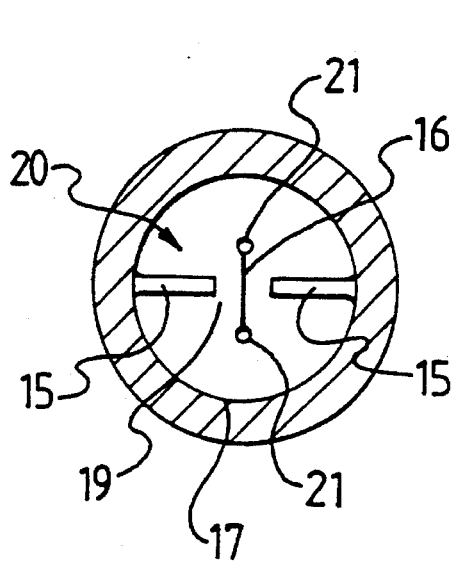
FIG. 6 shows a cross-sectional view on the plane VI—VI of FIG. 4.
Figure 5:
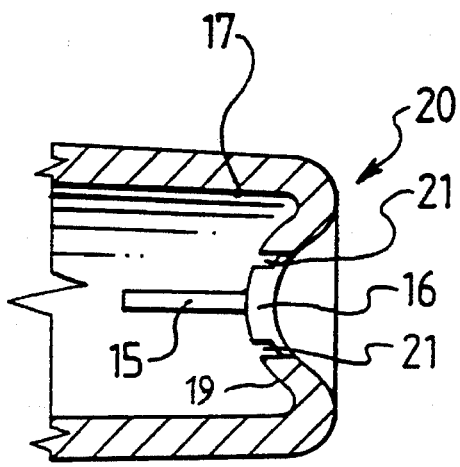
FIG. 5 shows a central longitudinal cross-section through the end of the teat of FIG. 4, at right angles to the cross-section shown in FIG. 4.

Referring now to the alternative embodiment shown in FIGS. 4, 5 and 6, experimentation has shown that the larger and thicker the webs 15, the faster the flow of milk and the better the seal of the slit 16. However, this puts a lot of stress on the end of the teat and the ends of the slit tend to tear after prolonged use. A smaller web of the same thickness (namely 2 mm) has a lesser milkflow but it still puts stress on the end of the teat, although it lasts longer than one with the larger web. The seal is still satisfactory.

A larger, thin web of thickness 0.75 mm appears to be the best compromise and this configuration is illustrated in FIGS. 4, 5 and 6. The milkflow is still adequate and the web is able to stretch before it puts too much stress on the teat. The seal is good and the teat lasts well.

A teat with no internal webs is too slow to release liquid to be of any use unless the slit is made larger, which makes the seal inadequate. It should be appreciated that the seal is primarily achieved by the resilience of the rubber of the teat, assisted by the inward doming, coning or cusping of the end where such is provided, and secondarily the webs may be of some assistance to stiffen the sides of the slit.

The webs 15 preferably have an included angle of about 30° where they meet with the internal cylindrical walls 17 of the teat and where they meet on the convex inner surface 19 of the closed end 20 of the teat they are spaced about 5 mm apart. The preferred radius of curvature of the convex outer end of the teat is about 5 mm.

To prevent the slit 16 from elongating or tearing it is preferable to mould a small stress-relieving cavity or internal indentation 21 at each end of the slit. The cavities only need to be about 1 mm in diameter and about 75% of the rubber thickness in length as shown in FIGS. 5 and 6. The center to center spacings of the cavities are preferably about 6 mm.

The preferred length of the teat is about 66 mm overall. The length of the teat projecting beyond the flange 22 is approximately 60 mm. If this length is much greater then it becomes too long for a smaller calf which will tend to gag while feeding. If it is shorter then it becomes too short for an older calf to feed properly. The locking means is preferably an integral circumferential flange 23 of triangular cross-section as shown in FIG. 4.

In order to facilitate placement of the teat into a liquid source from the outside, e.g. where the teat is to be inserted into the side wall of a length of pipe for example, and there is no ready access from the inside, it is preferable for the flange portion to be substantially elliptical with its minor axis aligned with the direction of the slit.

Obviously the teats could also be slid over the end of a tube in which case no flange would be needed but the fastening means could conveniently be internal ridges in the bore 24 adapted to grip on external circumferential ridges on the end of the tube.

Turning now to FIGS. 7 to 12, these depict the configuration of the most preferred form of teat where the web and slit configuration is that described with reference to FIGS. 4 to 6 but the flange 25 is modified to provide it with two flats 26 at right angles to the slit 16a. The flats are preferable to an elliptical flange making it still easier to insert the teat into a liquid source from the outside and also where end users install the teats themselves into the liquid source the flats, being at 90° to the slit, may provide an easy means of visual alignment. The slit 16a must be substantially vertical for the teat to work properly when subjected to the normal biting action of a sucking animal. Since the teats will usually be installed at the bottom of the side wall of a container which may have been pressed from stainless steel or moulded from plastics, the lowermost flat 26 prevents the flange from being held proud of the internal wall of the container by the curve which would usually be present between the side walls and the base of the container while yet allowing the teat to be situated as low as possible on the side wall.

Various rubbers have been developed over a long period of time to be suitable for use in a farming environment, e.g. with milking machines and the like. Essentially, such rubber compounds are suitable for use with the present invention but obviously there is some choice available and one can select from different hardnesses of rubber, with consequent different sealing capacities and different lifespans. The rubber which has been found to be the most suitable compromise is 50 Shore A natural rubber. It is necessary for at least the outer end of the teat to be resilient and preferably the teat is moulded in one piece from the same rubber compound.

It will be appreciated from the above description that the reinforcing means, which are provided by the webs, usually act in tension when the end of the teat is squeezed in the appropriate direction. In effect they serve to grasp the mid point of the usually domed end on either side of the slit and to stretch it open because the webs restrain the distortion of the relative spacing between the domed inner end and the side walls of the teat in the plane of the webs. When the teat is subjected to a biting action with a force component along the length of the slit the end of the teat tends to assume an oval shape with the minor axis aligned with the direction of the slit. As the relative spacings of the points 27 and 29 (shown in FIG. 9) remain substantially constant (apart from the tendency of the webs to stretch) it can be appreciated that there are opposite forces applied at the side of the slit 16a through the webs 15a which tend to pull the slit open. In such a situation the webs are acting in tension. When there is no biting force on the end of the teat then the webs tend to assume their normal position and may contribute to pushing the edges of the slit closed.

Thus the present invention really allows the use of a much smaller slit than would otherwise be possible for a given rate of flow of liquid out of the slit facilitating better sealing of the slit when there is no sucking occurring. It will be appreciated from this explanation that the webs 15a while preferably internal of the closed end 20a could equally well be provided externally in a domed, coned or cusped region 30 shown in FIG. 9. However, it is obvious that that would not be the preferable position because the thin webs would be exposed more easily to damage. It will also be appreciated that were it practical to mould a direct link between the points 27 and 29, such as a rod of rubber, this could achieve much the same effect of drawing the slit apart when the end is squeezed together along the direction of the slit. However, webs are easier to mould. There may also be more than just one pair of webs if desired. While the end of the teat is preferably domed inwardly it can be formed into an inward cone or an inward cusp shape or even a multi-sided shape e.g. in the shape of a hipped or gable roof with the slit running along the ridge or any other suitable re-entrant shape that assists sealing of the slit.

I claim:

1. A teat adapted to be fastened to a source of liquid in use to project outwardly from the source, the teat having an outer end which is closed apart from a slit in it which slit is itself normally adapted to be closed to provide a sufficient liquid seal, wherein the outer end of the teat is made of a resilient material with an integral unitary reinforcing member on either side of the slit selectively stiffening part of the teat so that if the end of the teat is squashed or compressed by forces with components along the direction of the slit, the reinforcing member stretches the slit open, thereby allowing liquid to flow out of it in use.

2. A teat as claimed in claim 1 wherein the slit terminates at an internal indentation or cavity at each end.

3. A teat as claimed in claim 1 wherein the reinforcing member is internal of the teat.

4. A teat as claimed in claim 3 wherein the teat is substantially cylindrical, having inner and outer substantially cylindrical wall surfaces and having a hollow center and wherein the reinforcing member comprises webs bridging between the inner surface of the outer end and the inner substantially cylindrical wall surface.

5. A teat as claimed in claim 4 wherein there are two such webs which are co-planar on the same diameter substantially at right angles to the slit.

6. A teat as claimed in claim 5 wherein the web walls are about 0.75 mm thick and the length of the slit is about 6 mm.

7. A teat as claimed in claim 5 wherein the whole teat is made of a flexible material and further comprising fastening means which comprises a substantially circular flange portion adapted to lie on the inside of the liquid source, such as a container, in use, a substantially cylindrical portion adapted to pass through a hole in the container, in use, and a locking portion adapted to press on the outer wall of the container, in use, to hold the teat in position with the flange against the internal wall of the container.

8. A teat as claimed in claim 7 wherein the locking portion is in the form of an integral circumferential rib of substantially triangular cross-section.

9. A teat as claimed in claim 7 wherein the substantially circular flange has two opposite flats at its circumference which are aligned substantially at right angles to said slit.

10. A teat as claimed in claim 1 wherein the reinforcing member is external of the teat.

11. A teat adapted to be fastened to a source of liquid in use to project outwardly from the source, the teat having an outer end which is closed apart from a slit in it which slit is itself normally adapted to be closed to provide a sufficient liquid seal, wherein the outer end of the teat is made of a resilient material with an integral reinforcing member on either side of the slit selectively stiffening part of the teat so that if the end of the teat is squashed or compressed by forces with components along the direction of the slit, the reinforcing member stretches the slit open, thereby allowing liquid to flow out of it in use, wherein the closed outer end is concave, coned, cusped, or otherwise re-entrant.

12. A teat as claimed in claim 11 wherein the reinforcing member is external of the teat.

13. A teat as claimed in claim 11 wherein the reinforcing member is internal of the teat.

14. A teat as claimed in claim 13 wherein the teat is substantially cylindrical, having inner and outer substantially cylindrical wall surfaces and having a hollow center and wherein the reinforcing member comprises webs bridging between the inner surface of the outer end and the inner substantially cylindrical wall surface.

15. A teat as claimed in claim 14 wherein there are two such webs which are co-planar on the same diameter substantially at right angles to the slit.

16. A teat as claimed in claim 15 wherein the web walls are about 0.75 mm thick and the length of the slit is about 6 mm.

17. A teat as claimed in claim 15 wherein the whole teat is made of a flexible material and further comprising fastening means which comprises a substantially circular flange portion adapted to lie on the inside of the liquid source, such as a container, in use, a substantially cylindrical portion adapted to pass through a hole in the container, in use, and a locking portion adapted to press on the outer wall of the container, in use, to hold the teat in position with the flange against the internal wall of the container.

18. A teat as claimed in claim 17 wherein the locking portion is in the form of an integral circumferential rib of substantially triangular cross-section.

19. A teat as claimed in claim 17 wherein the substantially circular flange has two opposite flats at its circumference which are aligned substantially at right angles to said slit.

20. A teat adapted to be fastened to a source of liquid in use to project outwardly from the source, the teat having an outer end which is closed apart from a slit in it which slit is itself normally adapted to be closed to provide a sufficient liquid seal, wherein the outer end of the teat is made of a resilient material with an integral unitary reinforcing means on either side of the slit selectively stiffening part of the teat so that if the end of the teat is squashed or compressed by forces with components along the direction of the slit, the reinforcing means stretch the slit open, thereby allowing liquid to flow out of it in use.

* * * * *